United States Patent

Shih

[11] Patent Number: 5,845,982
[45] Date of Patent: Dec. 8, 1998

[54] VISIBLE LASER DIODE MODULE

[75] Inventor: Yu-Ming Shih, Hsinchu, Taiwan

[73] Assignee: Tony Investment Co., Ltd., Taipei, Taiwan

[21] Appl. No.: 932,295

[22] Filed: Sep. 17, 1997

Related U.S. Application Data

[63] Continuation of Ser. No. 685,687, Jul. 24, 1996.

[30] Foreign Application Priority Data

Jun. 14, 1996 [TW] Taiwan ................................ 85209021

[51] Int. Cl.⁶ .................................................. G03B 21/00
[52] U.S. Cl. ............................................................ 353/42
[58] Field of Search ........................ 353/42, 43; 362/121, 362/259

[56] References Cited

U.S. PATENT DOCUMENTS

| 5,024,494 | 6/1991 | Williams et al. | 353/42 |
| 5,450,148 | 9/1995 | Shu et al. | 353/42 |
| 5,718,496 | 2/1998 | Feldman et al. | 353/42 |

Primary Examiner—William Dowling
Attorney, Agent, or Firm—Finnegan, Henderson, Farabow, Garrett & Dunner, L.L.P.

[57] ABSTRACT

The invention, relates to a visible laser diode module, comprises a laser diode dice, a submount, and a heat dissipating metal block. A dice is mounted on a submount, and then exposedly mounted on a heat dissipating metal block. The heat dissipating metal block further comprises a conductive pad which is electrically insulated to the heat dissipating metal block and is used for electrically coupling to the laser diode dice.

11 Claims, 2 Drawing Sheets

VISIBLE LASER DIODE MODULE

This is a division of application Ser. No. 08/685,687, filed Jul. 24, 1996.

FIELD OF THE INVENTION

The invention relates to a visible laser diode module, and more particularly, to a visible laser diode module wherein a laser diode dice is mounted on a submount firstly and then directly mounted on a heat dissipating metal block. The invention also relates to an apparatus including such a module.

REFERENCE TO PRIOR APPLICATION

This application has been filed in the R.O.C. (Taiwan) as Patent Application No. 85209021 on 14 Jun. 1996.

BACKGROUND OF THE INVENTION

The laser diode is widely used in projecting and alignment apparatus, such as laser pointers, aligners and leveling equipments. However, the structure of the conventional visible laser diode module, as shown in FIG. 1, has many limitations. Since the diode dice is sensitive and subjective to external damage, the laser diode dice after being attached on the TO Header should be packed to prevent from external damage. Therefore, the packing process of the conventional laser diode (24) at least comprises the steps of: mounting the laser diode dice on the TO Header (242); packing the TO Header with a Cap (241) to prevent the dice from external damages; and filling nitrogen gas in the laser diode package. Therefore, the dimension of the completed laser diode package is at least about 5.6 mm. In application, the laser diode package is still needed to be connected to the circuit board, metal assembly, lens and so on to form the basic structure of the currently used pointers and aligners.

FIG. 2 is a representation of the basic structure of a projector using the conventional visible laser diode module. The structure mainly comprises a light projecting base (21), an O ring (22), lens (condensing lens) (23), a housing (26), a laser diode (24) and a circuit board (25), etc. The main drawback of the conventional laser diode module is its volume could not be reduced and thus the dimension of the projector could be as large as 9 mm. Therefore, the conventional module could not be applied to the specific applications such as the small volume applications. Besides, the laser diode dice of the conventional module is placed on the TO Header and is packed with a cap, thus the heat dissipating effect of the TO Header of the conventional module is insufficient and thus lifetime of the laser diode module is short. Furthermore, the conventional module has many constituent parts and thus the packing process takes a great amount of time, labor and cost.

SUMMARY OF THE INVENTION

In view of the drawbacks of the prior art, it is an object of the present invention to provide a visible laser diode module which utilizes a novel processing technique to overcome the disadvantages of the conventional laser diode dice by adding an additional metal protecting layer on the reflect mirror of the laser diode dice. Such a laser diode dice is mounted on a submount firstly, and then mounted on a heat dissipating metal block. After such an assembly, the dice can have a better heat dissipating effect, thus no package is needed anymore. Therefore, the packing steps can be reduced, and the fabrication process thereof is simplified. With such a laser diode module, the volume of the module can be as small as 1 mm and thus can be applied to the specific small volume applications.

It is another object of the present invention to provide a visible laser diode module with satisfied heat dissipating effect so as to prolong the lifetime of the module.

It is a further object of the present invention to provide a visible laser diode module with few constituent parts so as to reduce the fabricating time, labor and cost.

BRIEF DESCRIPTION OF THE DRAWINGS

For a more complete understanding of the present invention and the advantages thereof, reference is now made to the following descriptions taken in conjunction with the accompanying drawings which illustrate one or more embodiments of the present invention.

DETAILED DESCRIPTION OF THE INVENTION

Figure 1:
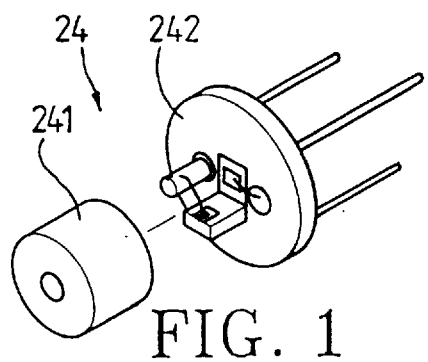
FIG. 1 illustrates an exploded view of the conventional laser diode module.
Figure 2:
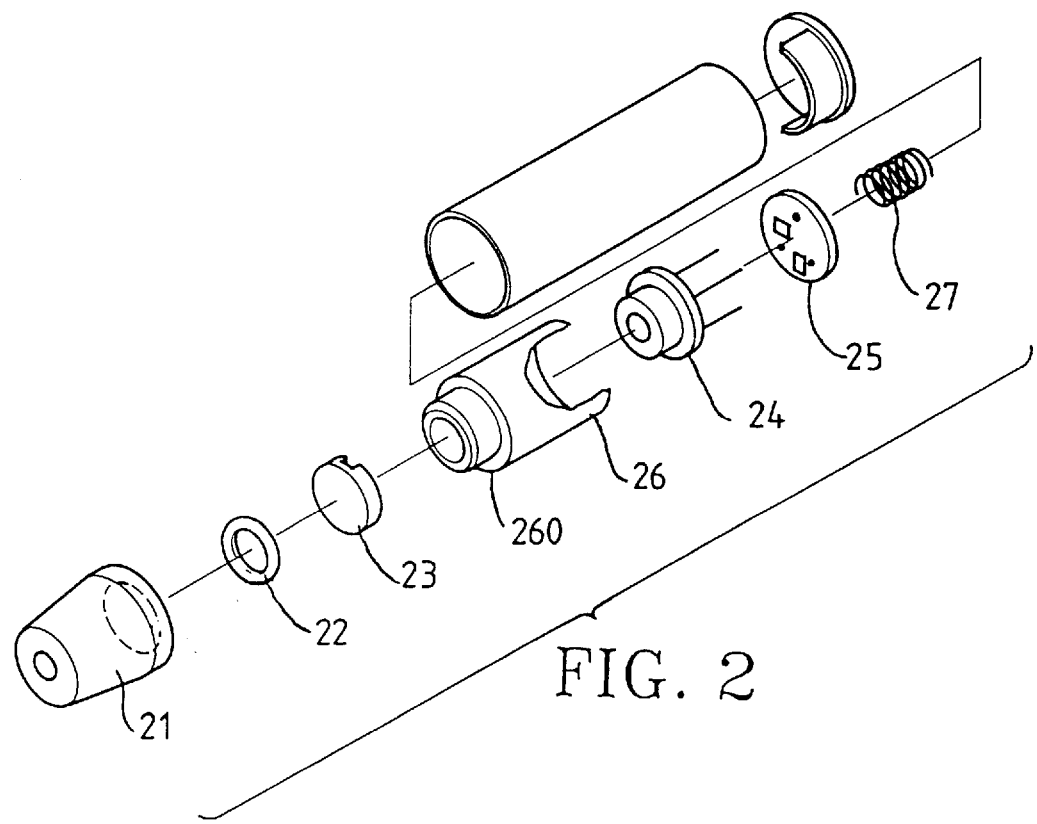
FIG. 2 illustrates an exploded view of a conventional projector, in accordance with the conventional laser diode module.
Figure 3:
FIG. 3 illustrates a side elevation view of a laser diode module, in accordance with the present invention.

In view of the conventional process of the laser diode, the dice cannot be exposed due to its subjective characteristic such that the conventional laser diode dice should be packed into a module as shown in FIG. 1, and the applications are thus limited. Referring to FIG. 3, the present invention is characterized by utilizing a novel technique to mount a dice (31) on a submount (33), and then the dice (31) exposedly mounted on a heat dissipating metal block (32) so as to increase the heat dissipating efficiency. The heat dissipating metal block (32) also serves as a pole of the laser diode. The present invention then mounts a conductive pad (34) on a portion of the surface of the heat dissipating metal block (32) with an electrical insulated material to serve as another pole of the laser diode, electrically couples the dice (31) to the conductive pad (34) by bonding, and connects the conductive pad (34) to an external power source (not shown) with electrical wires. The visible laser diode module (3) of the present invention is now accomplished. Such a visible laser diode module (3), can be further packed (such as packing a TO Header) or does not need any additional packing processes, can be directly applied to the optical means such as projectors or aligners.

Figure 4:
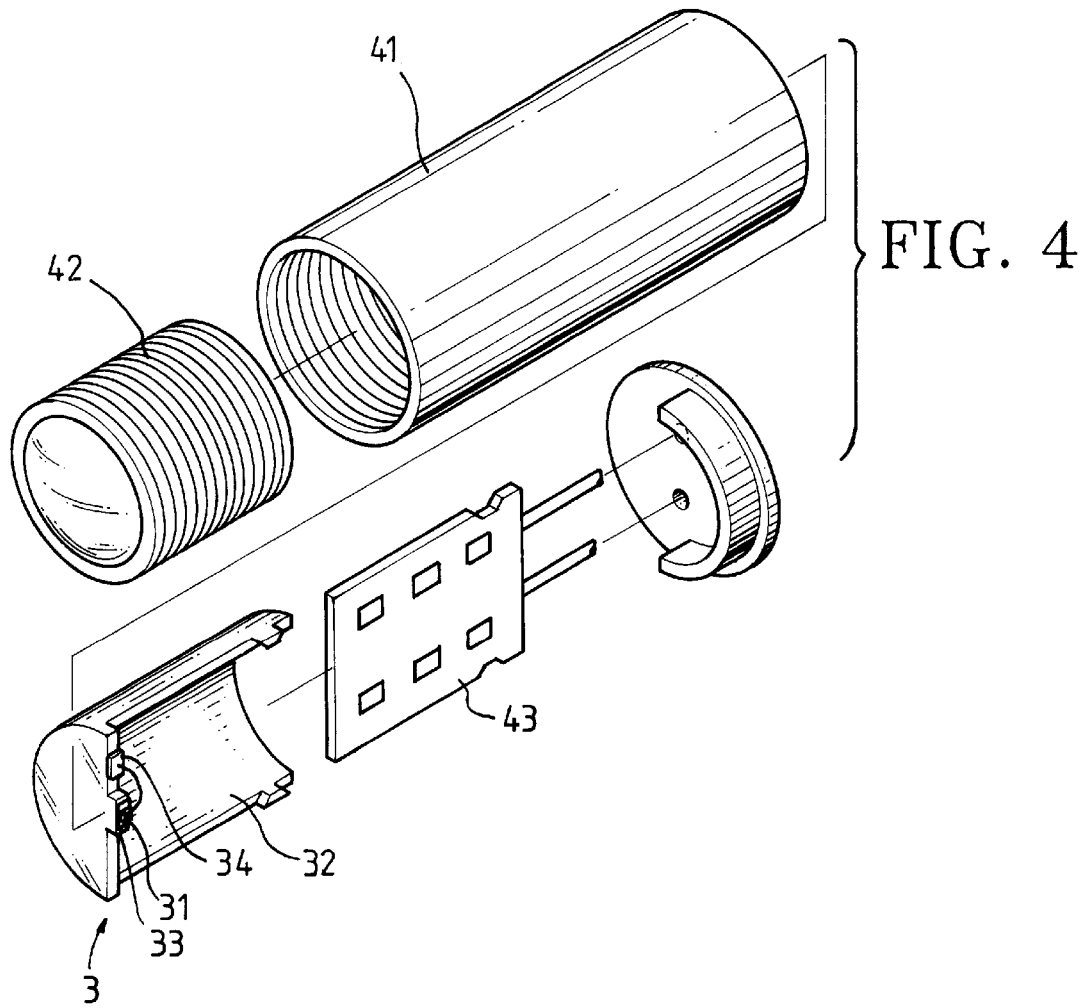
FIG. 4 illustrates an exploded view of a projector, in accordance with the laser diode module of the present invention.
Figure 5:
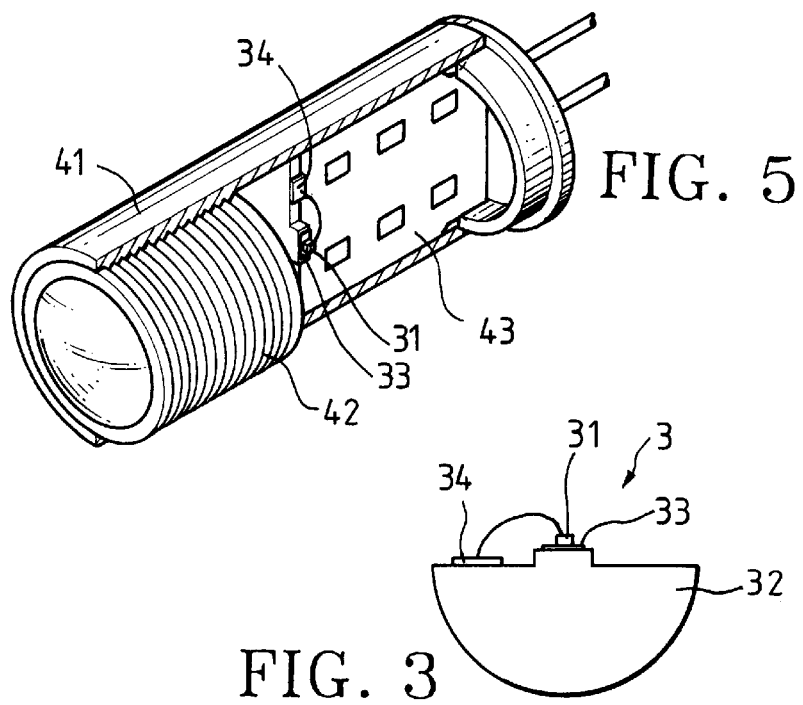
FIG. 5 illustrates a partial cross-sectional view of the completed projector in FIG. 4.

Referring to FIGS. 4 and 5, the figures illustrate the structure configuration of a visible laser pointer that includes the laser diode module (3) of the present invention.

As shown in the FIGS. 4 and 5, the laser diode module (3) of the present invention is placed in a housing (41), wherein the shape of the heat dissipating metal block (32) can be varied with the shape or length of the housing (41). However, the basic connecting way, a dice (31) is mounted on a submount (33) and then exposedly mounted on a heat dissipating metal block (32), is the same. In accordance with the visible laser pointer principle, the front end of the housing (41) should have a lens assembly (42) to focus the light that emits from the visible laser diode module (3). A battery (not shown) that supply power to the laser diode module (3) is electrically connected to the heat dissipating metal block (32).

As shown in FIG. 4, the laser pointer has a control circuit board (43) that controls the emitting ways of the visible laser diode module (3). Obviously, whether a circuit board (43) is necessary depends on the application demand and thus is not a prerequisite. In accordance with the visible laser diode module (3) of the present invention, the module does not need additional packing processes, thus the volume of the module can be reduced. Besides, the circuit board (43) can be directly placed on the heat dissipating metal block (32) as shown in FIG. 5, thus the assembled volume is less than the conventional one. Therefore, though the circuit board (43) is added onto the module, it will not increase too much volume.

In the embodiment, a dice (31) is about 0.1 mm and is mounted on a submount (33), and then exposedly mounted on a heat dissipating metal block (32), thus the volume of the heat dissipating metal block (32) can be as small as 1 mm (10 times the volume of the dice) to achieve the demand of heat dissipation. Therefore, the volume of the visible laser diode module (3) could be reduced and be provided for the specific small volume applications.

In another embodiment, the circuit board (43) can be designed by AVC (Automatic Voltage Control), ACC (Automatic Current Control) or APC (Automatic Power Control). In the application with APC, it further needs an optical detector (not shown). The optical detector could be placed on the circuit board (43) or the heat dissipating metal block (32). The size of the optical detector is merely about 0.1 mm, thus the overall volume of the visible laser diode module (3) is still less than the conventional one.

As described above, the invention initially mounts a dice on a submount, and then the dice exposedly mounted on a heat dissipating metal block to increase the heat dissipating efficiency and prolong the lifetime of the visible laser diode module. Besides, the invention has simple constituent parts, it simplifies the packing process of the visible laser diode module and saves time, labor and cost, and can be applied to the specific small volume applications. The visible laser diode module can be applied to the visible laser pointers, leveling equipments and aligners in accordance with the embodiments of the present invention. Therefore, the invention has the features of novelty and progressiveness, it also has industrial applicability and should be granted a patent.

Although the present invention and its advantage have been described in detail, it should be understood that various changes, substitutions and alternations can be made herein without departing from the spirit and scope of the invention as defined by the appended claims.

What is claimed is:

1. A visible laser pointer apparatus, comprising:

a len assembly, a submount, a heat dissipating metal block having a conductive pad, a laser diode dice, a housing and a cover, wherein said laser diode dice is mounted on said submount and then mounted on said heat dissipating metal block, said heat dissipating metal block and the laser diode dice thereon are placed into said housing from the rear end of said housing and are connected with an external power source via electrical wires, said len assembly is placed in the front end of said housing for focusing the light emitting from said laser diode dice, said cover props up and fixes said heat dissipating metal block at the rear end of said housing.

2. The apparatus according to claim 1, wherein said heat dissipating metal block further serves as a pole of said laser diode, and said conductive pad is electrically insulated from said heat dissipating metal block and is electrically coupled to said laser diode dice and serves as another pole of said laser diode dice.

3. The apparatus according to claim 1, wherein said conductive pad is connected with external power source via electrical wires.

4. A visible laser pointer apparatus, comprising:

a len assembly, a submount, a heat dissipating metal block having a conductive pad, a circuit board, a laser diode dice, a housing and a cover, wherein said laser diode dice is mounted on said submount and then mounted on said heat dissipating metal block, said heat dissipating metal block and the laser diode dice thereon are electrically coupled to said circuit board and then placed into said housing from the rear end of said housing, and are connected with an external power source via electrical wires, said len assembly is placed in the front end of said housing for focusing the light emitting from said laser diode dice, said cover props up and fixes said heat dissipating metal block at the rear end of said housing.

5. The apparatus according to claim 4, wherein said heat dissipating metal block further serves as a pole of said laser diode, and said conductive pad is electrically insulated from said heat dissipating metal block and is electrically coupled to said laser diode dice and serves as another pole of said laser diode dice.

6. The apparatus according to claim 4, wherein said conductive pad is connected with said circuit board via electrical wires.

7. The apparatus according to claim 4, wherein said circuit board is connected with external power source via electrical wires.

8. The apparatus according to claim 4, wherein said circuit board can be replaced with a resistor.

9. The apparatus according to claim 4, wherein said circuit board is an AVC.

10. The apparatus according to claim 4, wherein said circuit board is an ACC.

11. The apparatus according to claim 4, wherein said circuit board is an APC, said apparatus further comprises an optical detector, the size of said optical detector is about 0.1 mm, said optical detector can be placed either on said circuit board or heat dissipating metal block.

\* \* \* \* \*